United States Patent Office 3,523,602
Patented Aug. 11, 1970

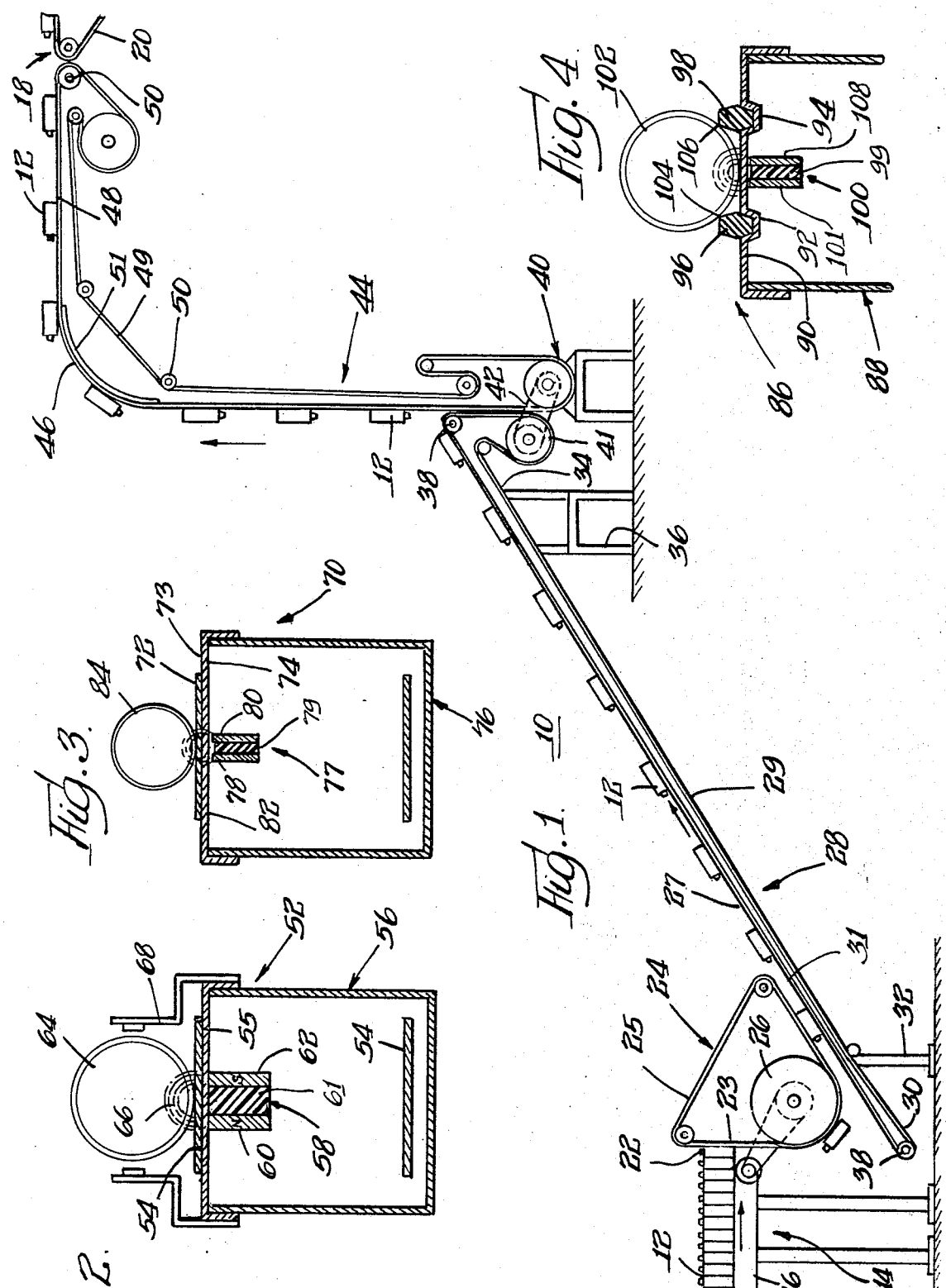

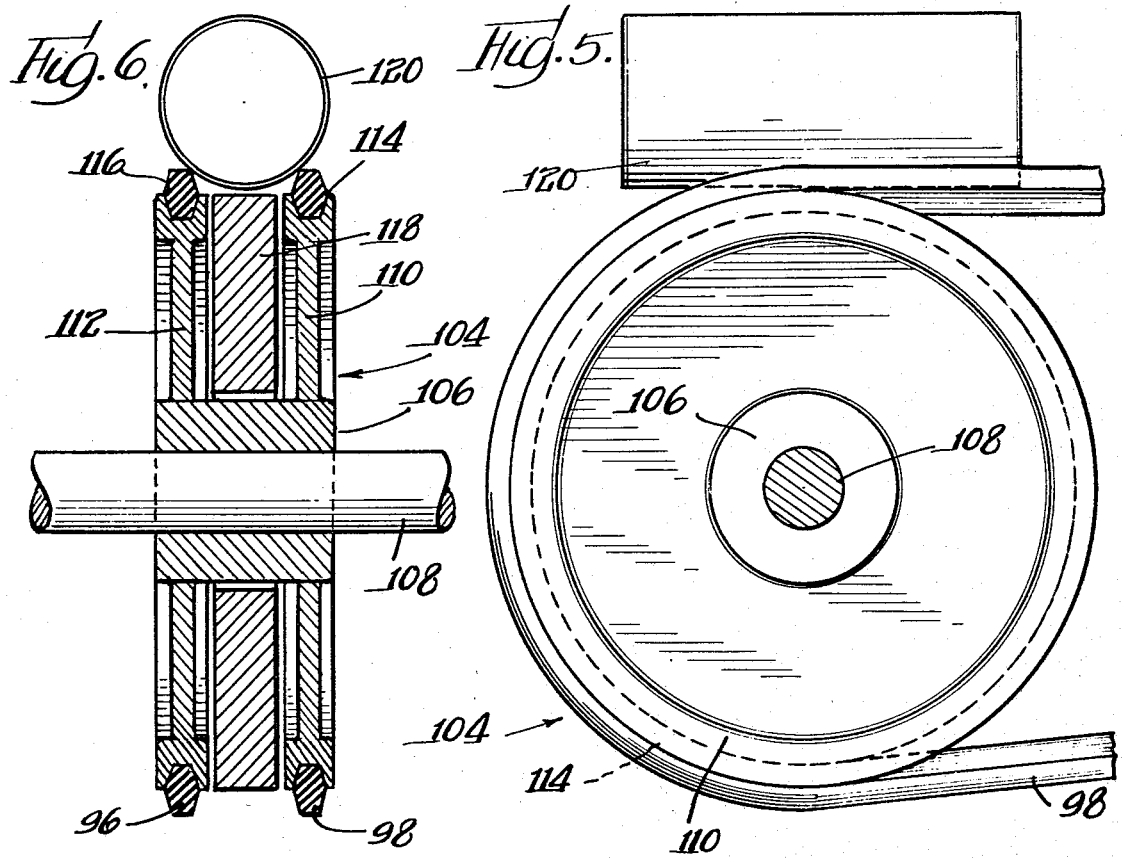
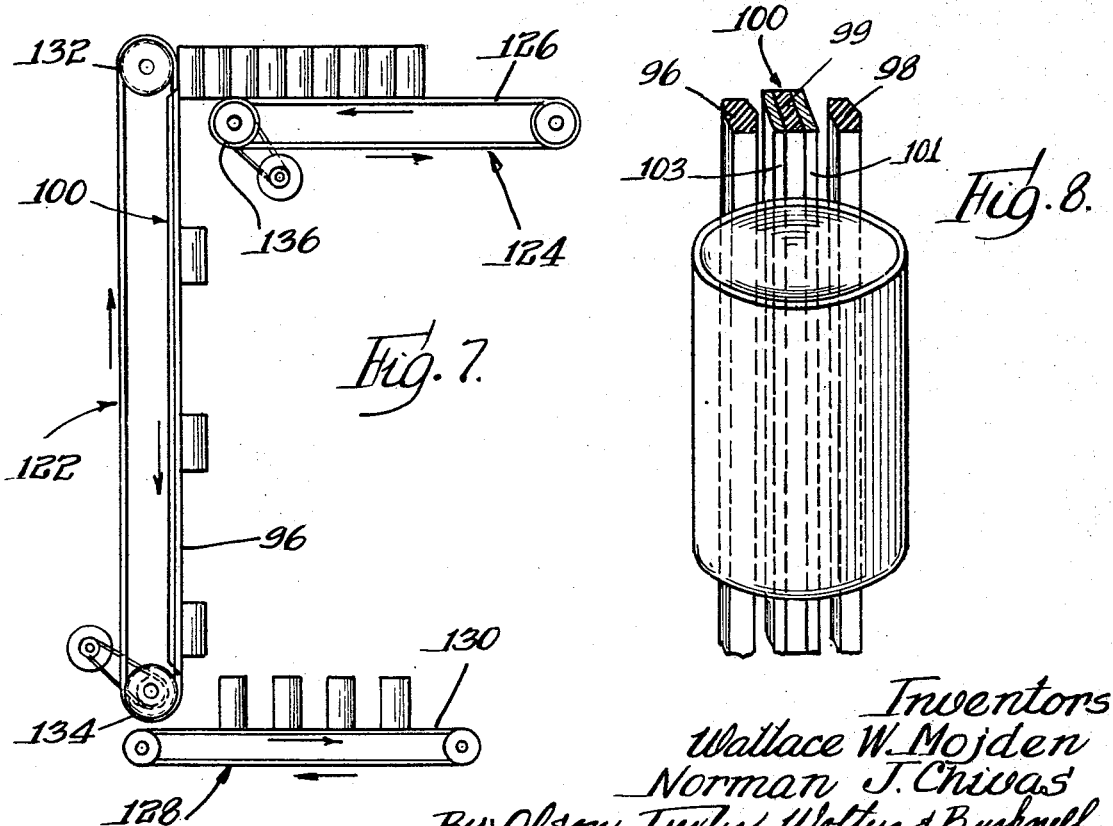

3,523,602
CAN HANDLING APPARATUS
Wallace W. Mojden, Palos Heights, and Norman J. Chivas, Naperville, Ill., assignors to Fleetwood Systems, Inc., La Grange, Ill., a corporation of Illinois
Filed Mar. 14, 1968, Ser. No. 713,169
Int. Cl. B65g 17/46
U.S. Cl. 198—41                     6 Claims

ABSTRACT OF THE DISCLOSURE

A method and apparatus for transporting magnetizable cans or the like including an endless belt member, either of a flat or double-belt type, upon which the cans are carried on the sides thereof, and a permanent magnet adjacent the belt member on the opposite side thereof from the cans and extending along the path of the belt member, the poles of the permanent magnet being relatively close together and located at the center of the belt member so as to magnetically secure the cans to the belt member while preventing rotation of the cans thereon. In one embodiment of the apparatus, a magnetic transfer wheel is used as one of the pulleys upon which the belt member is mounted for changing the direction of movement of the cans thereon.

BACKGROUND OF THE INVENTION

This invention relates to a method and apparatus for transporting articles and more particularly to apparatus for transferring metal cans or the like.

In the manufacturing of cans or in the processing of cans that have already been manufactured, conveyor belt arrangements, both of the magnetic and non-magnetic type, are presently being used to transfer the cans from location to location. Ordinarily, the cans stand upright on the belt with one end extending outwardly therefrom and are carried along thereby.

While the above described arrangements are for the most part satisfactory, the cans often become unstable and have a tendency to tip en route. This is even more likely to occur when the cans are tall and contain liquid which easily shifts within the can.

SUMMARY OF THE INVENTION

Accordingly, it is a primary object of this invention to provide a method and apparatus for conveying metallic cans or the like which overcomes the problems mentioned above.

It is a more specific object of this invention to provide a conveyor belt arrangement upon which cans may be transported in a stable, reliable manner.

It is still another object of this invention to provide a magnetic conveyor belt arrangement for transferring magnetizable, metallic cans on their sides while maintaining the positioning of the cans on the conveyor belt.

DESCRIPTION OF THE DRAWINGS

A better understanding of the present invention and its organization and construction may be had by referring to the description below in connection with the accompanying drawings, wherein:

FIG. 1 is an over-all view of can handling apparatus in which magnetic conveyor belt arrangements according to the invention are being used;

FIG. 2 is a cross-sectional view of one embodiment of a conveyor magnetic belt arrangement according to the invention;

FIG. 3 is a cross-sectional view of another embodiment of a magnetic conveyor belt arrangement according to the invention;

FIG. 4 is a cross-sectional view of still another embodiment of a magnetic conveyor belt arrangement according to the invention;

FIG. 5 is a side view of a rotatable transfer wheel having a magnetic conveyor belt arrangement similar to that shown in FIG. 4 mounted thereon and carrying a can;

FIG. 6 is a cross-sectional view of the arrangement of FIG. 5 taken along the lines 6—6 thereof;

FIG. 7 is a side view of a can handling maching employing a vertically oriented magnetic conveyor belt arrangement according to the invention; and FIG. 8 is an enlarged perspective view of the conveyor belt arrangement of FIG. 7 as it appears transporting a can.

DETAILED DESCRIPTION

Referring now to the drawings more in detail, FIG. 1 thereof illustrates can handling apparatus 10 which in general, through a series of magnetic conveyor belt arrangements according to the invention, transports cans 12 from a first station 14, herein illustrated at the lower left-hand portion of the page as a conveyor belt 16, to a second station 18, illustrated herein at the upper right-hand portion of the page as a conveyor belt 20.

As can be seen in FIG. 1, the cans 12 are delivered to a location 22 at the end of a conveyor belt 16 adjacent magnetic belt arrangement 24, which because of interconnecting drive belt 26 moves at approximately the same speed as conveyor 16. The cans 12 are magnetically attracted at a side thereof to belt 25 by means of a permanent magnet arrangement 23 mounted adjacent thereto, and carried along thereby about rotating magnetic wheel 26 to a second magnetic belt arrangement 28. Magnetic belt arrangement 28 is, as shown, inclined and supported at the lower end 30 thereof by support leg 32 and at the upper end 34 thereof by means of a support structure 36. The belt 29 of arrangement 28 is mounted for movement on a plurality of pulleys such as 38 and is driven by a motor and drive belt arrangement 40 which is connected to a drive wheel 41 by means of a drive belt 42.

The cans 12 are carried on their sides by belt 27 and held thereto by permanent magnet arrangement 31 mounted adjacent thereto from transfer wheel 26 to the end 38 thereof, whereat still another magnetic belt arrangement 44 is located. The belt arrangement 44, as can be seen in the figure, also receives the cans on their sides and transports them in that manner vertically upwardly, around a curved section 46 thereof to a horizontal portion 48, and onto conveyor belt 20 and station 18. A permanent magnet arrangement 51 is located adjacent belt 49 along the path traversed by the cans being transported thereby. Belt 49 is mounted for movement on pulleys such as 50 and is driven by the same drive mechanism 40 as is used to drive belt arrangement 28. This maintains the speed of both belt arrangements substantially the same. It should be noted that the can handling apparatus 10 of FIG. 1 is only an illustrative example of a type of can handling apparatus wherein a magnetic belt arrangement according to the invention may be used, and that other systems, etc., of can handling apparatus are able to make use of the belt arrangement according to the invention equally as well.

Looking now at FIG. 2 of the drawings, there is shown therein one specific embodiment 52 of a magnetic belt arrangement according to the invention. This particular embodiment includes a flat, non-magnetic belt member 54 mounted for movement along one side wall 55 of a support member 56, also of a non-magnetic material. On the opposite surface of wall 55 from support member 56, there is located a stationary magnet arrangement 58, here shown as a permanent magnet 61 sandwiched between a pair of metallic pole pieces 60 and 62, such as, for example, iron plates or the like. The permanent magnet 61, as shown, is polarized oppositely along opposite faces or surfaces thereof so as to induce in the entire left-most pole piece (FIG. 2) a north pole and in the entire right-most pole piece, a south pole. A permanent magnet which is especially desirable to use for this purpose is a ceramic type such as, for example, one having a barium ferrite composition. It should also be noted that to use the magnet arrangement 58 to best advantage the pole pieces should be of a thickness whereby they will not become magnetically saturated, but will only direct the magnetic field where desired. A can or the like object 64 is shown lying on its side on belt member 54. It will be noted that the pole pieces 60 and 62 are positioned close together (preferably making the distance between the outside faces thereof slightly less than the radius of the can being conveyed), near the center of can 64 so that a narrow magnetic field, illustrated by magnetic lines of force 66, is produced thereby. As can be seen, the flux lines 66 pass through the metallic can 64 essentially along only the portion thereof which is adjacent the pole pieces 60 and 62. Thus, the can is prevented from swivelling or rotating on its side on the belt member 54.

In the case of long runs, such as illustrated in FIG. 1, by belt arrangement 28, a pair of guide rails 68 are provided along the sides of support member 56 as a precautionary measure to insure that the cans do not fall from the belt member. As will be noted, the guide rails do not actually contact the moving cans so that there is no slowing down of the movement of the cans due to friction against the guide rails. While, as explained above, the guide rails are not necessary to the invention, as a practical matter they are used to insure against injuries to persons working about the can transferring apparatus.

FIG. 3 of the drawings shows another embodiment 70 of a magnetic conveyor belt arrangement according to the invention. This arrangement is similar to the one of FIG. 4 in that it includes a flat belt member 72 which is movable along the surface 73 of one wall 74 of a support member 76 with a stationary magnet arrangement 77 mounted with its magnetic pole pieces 78 and 80 adjacent the opposite surface 82 of wall 74 of the support member. Herein, however, the permanent magnet 79 is smaller in width and the pole pieces are positioned even more closely together than those of the embodiment of FIG. 2, to accommodate the smaller diameter can 84 being transported thereby. The spacing of the pole pieces, as mentioned above, depends upon the width of the can being transported. For narrower cans, the magnetic poles are positioned more closely, and for wider cans the opposite holds true. This insures the stability of the can while being transferred on the belt.

Looking now to FIG. 4 of the drawings, there is shown therein still another magnetic conveyor belt arrangement 86 according to the invention. This embodiment comprises a support member 88 including a wall 90 thereof having a pair of spaced apart troughs or recesses 92 and 94 therein. A pair of rubber or rubber-like belts 96 and 98 are mounted for movement within the troughs 92 and 94, respectively. This particular embodiment 86, employs a magnet arrangement 100 as shown, similar to those discussed previously.

As shown in FIG. 4, a can 102 resting on its side is supported by belts 96 and 98 at points 104 and 106 thereof, respectively. The can does not touch the wall 90 but is entirely supported by the belts, thus avoiding frictional slow-down. This particular type of belt arrangement, because of the use of rubber or rubber-like belts therein, is most desirable for use when transporting cans vertically. This will be discussed in more detail hereinafter when a discussion of FIGS. 7 and 8 of the drawings is presented. Another location where a magnetic conveyor belt arrangement such as 86 is useful is in the case of belt arrangement 24 of FIG. 1 of the drawings wherein cans are carried vertically downward about a transfer wheel 26 and onto another belt system, such as 28.

Referring to FIGS. 5 and 6 of the drawings, there is shown therein a magnetic pulley or transfer wheel 104 similar to wheel 26 of the magnetic belt arrangement 24 of FIG. 1 which, as shown, may be used in conjunction with a belt arrangement such as 86 of FIG. 4 to change the direction or transfer cans being carried by the belt arrangement. The wheel 104, as shown, includes a central hub portion 106 which is directly mounted on a rotatable shaft 108; the hub portion being secured to shaft 108 for rotation therewith. Mounted securely on hub portion 106 in a spaced-apart fashion, is a pair of flange members 110 and 112, serving as magnetic pole pieces and each having a recessed or trough-like portion 114 and 116, respectively, about the outer perimeter thereof for receiving therein belts such as 96 and 98, like those in belt arrangement 86 of FIG. 4. Between pole pieces or flange members 110 and 112, mounted for rotation on hub portion 106, is a permanent magnet disc member 118 which extends radially outwardly from hub portion 106 a distance approximately equal to that of the flange members 110 and 112. A can, as can be seen in FIGS. 5 and 6, is positioned on belts 96 and 98 and supported thereby tangentially to the wheel 104.

As shown in FIG. 1 of the drawings, the wheel 26 which is similiar to wheel 104 of FIGS. 5 and 6, must be of a large enough diameter to retain thereon the cans to be transferred thereby. If the diameter of the wheel is too small, an inadequate portion of the can side will be in contact with the wheel and the magnetic force of the permanent magnet will not be distributed through the can to hold it to the wheel. This accounts for the large diameter of the wheel 26, as shown in FIG. 1 of the drawings.

While the magnetic wheel 104 is shown to be constructed so as to accommodate a pair of belts 96 and 98 like those of FIG. 4, a magnetic wheel of the type which accommodates flat belts such as 54 or 72 of FIGS. 2 and 3, respectively, is also possible.

Referring now to FIGS. 7 and 8, there is shown therein a vertically oriented magnetic belt arrangement 122 according to the invention, which transports cans on their sides from a first station 124 including a conveyor belt system 126 which carries the cans on their ends to a second station 128 which includes a second conveyor belt system 130, also of the type that transports cans on their ends. As heretofore explained, this type of magnetic belt arrangement is especially well suited for transferring cans in a vertical direction, as shown in FIG. 7 of the drawings. This is true because the double rubber or rubber-like belts such as 96 and 98 tend to frictionally hold the can and prevent it from sliding or falling from the belt.

As will be noted in FIG. 8 of the drawings, the magnetic belt arrangement is similar to that shown in FIG. 4 of the drawings, only the arrangement herein is being used to transport the cans vertically downward, as explained above. As will be noted in FIG. 7 of the drawings, the magnet arrangement 100 is permanently mounted on the side of moving belts 96 and 98 opposite the moving cans, and extends from the upper pulley 132 to the lower driven pulley 134. The magnetic field from the magnet arrangement 100 is sufficient to attract metallic cans which reach the end 136 of conveyor 124 and to hold the cans to the belts 96 and 98 as they are carried downwardly to conveyor belt 128. The magnet arrangement 100 as shown in FIG. 8 as well as those discussed previously, includes a sandwiched ceramic magnet 99 which extends the length of the pole pieces 101 and 103, however, to conserve magnetic material, a plurality of smaller ceramic magnets may be placed at spaced intervals along the path which the can travels, between the pole pieces which extend the full length thereof. This is true in all embodiments of the magnetic conveyors according to the invention.

Thus, the magnetic conveyor belt according to the invention provides a stable, efficient device for transporting magnetizable cans or the like on their sides from location to location.

The specific examples of the invention as herein shown and described are for illustrative purposes only. Various changes in structure will no doubt occur to those skilled in the art, and will be understood as forming a part of the present invention insofar as they fall within the spirit and scope of the appended claims.

What is claimed is:

1. Can handling apparatus comprising: a first station for handling can bodies, and including means for advancing said can bodies along a predetermined path in an upright condition for supply to conveyor means; and conveyor means adapted to receive said can bodies and transport them to a second station spaced from said first station; said conveyor means including: endless belt means mounted on a plurality of spaced apart rollers, a section of said belt means disposed transverse to the path of movement of said upright can bodies being supplied from said first station; and magnetic means associated with said section of the endless belt means, said magnetic means being substantially continuous for and extending along the length of said section, said magnetic means attracting the can bodies from said first station into engagement with said belt means and maintaining said bodies in engagement therewith during transport with the side walls of said can bodies in contact with the belt means, whereby rolling and rotation of the can bodies during transport are precluded.

2. Can handling apparatus as defined in claim 1, wherein said magnetic means include at least one assembly comprising an elongate permanent magnet sandwiched between a pair of spaced apart elongate pole pieces, said magnet and pole pieces being disposed edgewise with respect to said belt means, such that the flux paths established by said magnet means will intersect the side walls of the cans at only two locations thereby to stabilize said can bodies on the belt means.

3. Can handling apparatus as defined in claim 2, wherein said belt means include a flat belt member carried by said rollers.

4. Can handling apparatus as defined in claim 1, wherein said belt means include a flat belt member, and said magnetic means include a pair of elongate spaced apart pole pieces, and at least one elongate permanent magnet sandwiched between said pole pieces, said pole pieces and said magnet being disposed edgewise relative to the sidewalls of said can body to be transported by said belt means, said magnetic means being positioned on the side of said belt means opposite that contacted by the can body side walls, said magnetic pole pieces being spaced apart a distance substantially equal to the circumferential width of that portion of the can bodies resting on said belt means thereby to prevent rotation of said cans relative thereto.

5. Can handling apparatus as defined in claim 1, wherein said endless belt means include a pair of belt members mounted in spaced apart relation on said plurality of rollers, said magnetic means being mounted on the side of said belt members opposite that contacting the side walls of the cans, and substantially at the center thereof.

6. Can handling apparatus as defined in claim 1, wherein one of said plurality of rollers include a transfer wheel for changing direction of movement of said cans on said conveyor means, said transfer wheel including a central hub portion mounted for rotation on a shaft, a pair of flange members carried by said hub portion and being in contact with said endless belt means, and magnetic means mounted between said flange members thereby consituting said flange member pole pieces such that the can bodies will be magnetically secured to said belt means as they pass over said transfer wheel.

References Cited

UNITED STATES PATENTS

| | | | |
|---|---|---|---|
| 1,937,991 | 12/1933 | Stearns | 198—41 |
| 2,276,472 | 3/1942 | Eberhart | 198—41 X |
| 2,642,174 | 6/1953 | Buccicone | 198—41 |
| 2,881,901 | 4/1959 | Zimmer | 198—41 |
| 3,185,285 | 5/1965 | Runco et al. | 198—41 X |
| 3,334,724 | 8/1967 | Steward | 198—41 |

HUGO O. SCHULZ, Primary Examiner